United States Patent [19]

Goodrich et al.

[11] Patent Number: 5,427,854
[45] Date of Patent: Jun. 27, 1995

[54] FIBERS CONTAINING POLYMER-COATED INORGANIC PARTICLES

[75] Inventors: Charles W. Goodrich, Waynesboro, Va.; Howard W. Jacobson, Wilmington, Del.

[73] Assignee: E. I. Du Pont de Nemours and Company, Wilmington, Del.

[21] Appl. No.: 212,402

[22] Filed: Mar. 14, 1994

[51] Int. Cl.6 ............................................... D02G 3/00
[52] U.S. Cl. ................................. 428/372; 428/403; 524/251; 524/533; 51/298
[58] Field of Search ................. 428/364, 372, 403; 51/298; 524/251, 533

[56] References Cited

U.S. PATENT DOCUMENTS

| | | | |
|---|---|---|---|
| 2,920,947 | 1/1960 | Burk et al. | 51/298 |
| 3,024,209 | 3/1962 | Ferrigno | 260/2.5 |
| 4,102,846 | 7/1978 | Bentley et al. | 524/533 |
| 4,548,975 | 10/1985 | Lewis et al. | 428/364 |
| 4,594,271 | 6/1986 | Scholten | 524/783 |
| 4,627,950 | 12/1986 | Matsui et al. | 264/103 |
| 4,710,535 | 12/1987 | Perrot et al. | 524/413 |
| 4,810,737 | 3/1989 | Dickerson | 524/251 |
| 5,108,684 | 4/1992 | Anton et al. | 264/176.1 |

FOREIGN PATENT DOCUMENTS 4317019 12/1993 Germany ..................... C09C 1/00

Primary Examiner—Patrick J. Ryan
Assistant Examiner—N. Edwards

[57] ABSTRACT

Synthetic organic fibers containing finely divided, inorganic particles that have certain organic polymeric coatings have significantly less abrasiveness compared to identical fibers in which the particles have no such coatings.

6 Claims, No Drawings

FIBERS CONTAINING POLYMER-COATED INORGANIC PARTICLES

BACKGROUND OF THE INVENTION

1. Field of the Invention

This invention relates to synthetic organic fibers that contain finely divided, abrasive, inorganic particles and a process for dispersing the particles in the fibers. More particularly, the invention concerns an improvement in such fibers, wherein the inorganic particles have a surface coating of an organic polymer, which is different from the polymer of the fibers. As a result of the improvement, abrasive wear of equipment used to handle the fibers is significantly decreased.

2. Description of the Prior Art

Synthetic organic fibers typically contain finely divided inorganic particles. The particles typically are intended to serve as delustrants, pigments, fillers, stabilizers, etc. The particles can be incorporated into the fibers alone or in combination with other materials and additives. For example, Anton et al, U.S. Pat. No. 5,108,684, which concerns the production of stain-resistant nylon fibers, discloses the use of a multipolymer nylon resin, in combination with the inorganic particles and other additives, to form a "masterbatch" for incorporation into a nylon polymer that is melt-spun into fiber. Perrot et al, U.S. Pat. No. 4,710,535, which also concerns production of master batches for nylon fibers, discloses the combination of (a) 10–50 weight % of finely divided titanium dioxide particles coated with silica and alumina and treated with a polysiloxane oil, with (b) 50–90% of a nylon-6/66 co-polyamide binder.

Fibers containing inorganic particles can be very abrasive and cause excessive wear in surfaces of equipment that come into contact with the fibers. The rubbing of moving fibers, filaments, threads and yarns which contain inorganic particles can severely abrade and score the surfaces of guides, rolls, winders, knitting needles and like equipment. To decrease such abrasive wear, various methods have been suggested. For example, lubricants have been dispersed into the body of the fibers or applied to the surface of the fibers to reduce fiber abrasiveness. However, further improvements are desired.

The present inventors in their attempts to decrease fiber abrasiveness found that unexpectedly large reductions in the abrasiveness of fibers can be obtained if the inorganic particles have a thin surface coating of an organic polymer when they are incorporated into the fiber.

Polymer-coated inorganic particles, per se, are known. For example, Published German Patent Application 4,317,019, discloses for use in paints, inks, plastics and cosmetic preparations, inorganic pigments which are coated with various organic polymers, such as melamine resins, polyethylene, polypropylene, polyurethanes, polyesters and others. Also, Ferrigno, U.S. Pat. No. 3,024,209, discloses the use of inorganic pigments coated with a polymeric film as fillers for extending flexible and semi-rigid open-celled polyurethane plastics. Neither of these references disclose the use of such coated particles in fibers.

SUMMARY OF THE INVENTION

The present invention provides an improved synthetic organic fiber containing finely-divided inorganic particles. To reduce the abrasiveness of the fiber, the improvement of the present invention comprises the inorganic particles having a coating of an organic polymer. Typically, the coating is of a solid polymer that is not the same as the polymer of the synthetic organic fiber. The inorganic particles typically amount to in the range of 0.5 to 8%, preferably 1 to 5%, of the total weight of the fiber. The weight of the coating is typically in the range of 0.3 to 8%, preferably 2 to 5% of the weight of the inorganic particles. When the fiber is an elastomeric polyurethane fiber, the polymer of the particle coating is preferably polyamide polymer. When the fiber is a nylon fiber, the polymer of the particle coating is preferably melamine resin or polyamide polymer.

The invention also includes certain novel polymer-coated inorganic particles and a process for preparing the fibers of the invention.

DETAILED DESCRIPTION OF PREFERRED EMBODIMENTS

The following descriptions of preferred embodiments of the invention are included for purposes of illustration and are not intended to limit the scope of the invention, which is defined by the appended claims.

"Fibers", as used herein, means filaments, fibers, and/or yarns prepared from synthetic organic polymer. Elastomeric fibers are capable of recovering rapidly and substantially completely from a tensile elongation of at least 100%. Such elastomeric fibers include thermoplastic elastomers, spandex and the like. Spandex as used herein has its customary meaning, namely, a manufactured fiber in which the fiber-forming substance is a long chain synthetic elastomer composed of at least 85% weight of a segmented polyurethane.

For convenience, in the discussion and examples that are presented below, the following abbreviations may be used for the accompanying term:

| | |
|---|---|
| PO4G | Poly(tetramethyleneether)glycol. |
| MDI | Methylene-bis(4-phenylisocyanate). |
| NCO | Isocyanate end group. |
| EDA | Ethylenediamine. |
| MPMD | 2-methyl-1,5-diaminopentane. |
| DNAC | N,N-dimethylacetamide solvent. |
| DEA | Diethylamine. |
| Elvamide ® 8063 | A 46/34/20 terpolymer of polycaprolactam (nylon-6), poly(hexamethylene adipamide) (nylon-6,6) and poly(hexamethylene sebacamide)(nylon-6,10) made by E. I. du Pont de Nemours & Co |
| "Melamine" Resin | A polymer of melamine and formaldehyde. |
| Cyanox ® 1790 | 1,3,5-tris(4-t-butyl-3-hydroxy-2,6-dimethyl-benzyl)-1,3,5-triazine-2,4,6(1H,3H,5H)trione, antioxidant sold by Cytec. |
| Methacrol ® 2462B | Polyurethane of N-t-butyl-diethanolamine and 4,4'-methylene-bis(cyclohexylisocyanate), made by E. I. du Pont de Nemours & Co. |

The chemical composition of a polymer of a spandex also may be abbreviated, for example, as follows. A polyurethaneurea made from a poly(tetramethyleneether) glycol ["PO4G"] having a number average molecular weight of 1800, methylene-bis(4-phenylisocyanate) ["MDI"] and a mixture of ethylene diamine ["EDA"] and 2-methyl-1,5-diaminopentane ["MPMD"] in a molar ratio of 90 to 10, is abbreviated as PO4G(1800):MDI:EDA/MPMD(90/10). Note that colons separate the monomers of the repeating units of the polymer, a slash (i.e.,/) between the diamines indicates that the diamines are in a mixture and the parenthetic numbers immediately following the glycol and diamine mixture respectively, refer to the number average molecular weight of the glycol and the molar ratio of the diamines in the mixture.

In accordance with the present invention, a wide range of synthetic organic fibers which contain inorganic particles have their abrasiveness importantly reduced by the presence of a polymeric coating on the particles. The invention is suitable for use fibers of polymers that can be melt-spun, dry-spun or wet-spun by conventional techniques. Preferred fibers include nylon fibers and spandex formed of a polyurethaneurea polymer.

Dispersed within the polymer of fibers of the invention are finely divided inorganic particles. The particles have an organic polymer coating on their surfaces. The organic polymer coating can completely or partially coat the surface of the particle. As used herein, the term "coated inorganic particles" is intended to include both totally coated and partially coated particles.

The polymer of the particle coating is not identical with the polymer of the fiber. If the coating polymer is initially the same as the fiber polymer, the coating polymer should be cross-linked or reacted with the surfaces of the inorganic particles before the coated particles are dispersed in the fiber polymer. Preferably, the coating polymer is solid (i.e., not liquid) and has a number average molecular weight of at least 2,500, preferably at least 15,000 and most preferably at least 25,000. It is believed that the surface tension of the coating polymer plays a role in satisfactorily incorporating the coated particles into the polymer of the fiber and that coating polymers having surface tensions of at least about 35 dynes/cm are useful. When intended for particles that are to be incorporated into fibers which are to be wet or dry spun, the polymer of the coating should be of limited solubility in the solvent used in the fiber forming process. Also, the coating on the particles should adhere to the surface of the particles sufficiently strongly so that during typical deagglomeration operations, such as sand-grinding, the coating is not damaged.

Typically, the polymeric coating amounts to in the range of 0.3 to 8%, preferably 2 to 5%, of the weight of the inorganic particles.

The finely divided inorganic particles for use in the present invention typically are chosen from pigments, delustrants, stabilizers, fillers and the like. The more inherently abrasive the inorganic particles are, the more effective the invention is in reducing abrasiveness of the fiber containing the particles. The abrasive particles can be within a wide range of hardnesses and sizes. The Mohs Hardness of the particles typically is in a range of about 4 to about 9. For example, the most commonly used inorganic particles are of anatase or futile titanium dioxide, which respectively have a hardness of 5.5 and 6.5. Fibers containing very hard pigments benefit especially from the present invention. For example, fibers containing cobalt aluminate, a blue pigment, which has a hardness of about 9 and which often imparts excessive abrasiveness to the fibers are rendered much less abrasive when the pigment is coated with organic polymer in accordance with the invention.

The size of the individual inorganic particles and more importantly, the size of agglomerates of the particles, also strongly affect the abrasiveness of the fibers that contain the particles. Best results are obtained with small particle sizes, and with very few and very small agglomerates within the fiber. Typically, the agglomerates of inorganic particles have a median size that is no greater than 20 microns, preferably no greater than 10 microns. Preferably, the median size of the primary particles is in the range 0.5 to 2 microns.

Typically, the inorganic particles amount to in the range of 0.5 to 8% of the weight of the synthetic organic polymer from which the elastomeric fiber is formed. Preferably, the particles comprise 1 to 5% of the total weight of the fiber.

Several methods can be used for applying organic polymeric coatings to inorganic particles to be incorporated in fibers of the present invention, such as spray coating techniques, coating from polymer solutions, and the like. One convenient method comprises the steps of spraying a solution or dispersion the coating polymer (e.g., a 10% solution of Elvamide® nylon multipolymer in alcohol or a 10% dispersion in water) onto the inorganic particles (e.g., titanium dioxide particles) while the particles are being vigorously tumbled, drying the thusly sprayed particles, and then deagglomerating or comminuting the coated particles. A fluid energy mill such as a steam micronizer operating at a suitable steam/particles ratio is satisfactory for the deagglomeration/comminution step. If the inorganic particles are available as a wet filter cake instead of as dry particles, the spray-coating step can be replaced by a step in which the coating-polymer solution or dispersion is mechanically thoroughly blended with the wet cake of inorganic particles.

The polymer-coated inorganic particles may be incorporated, alone or with other additives, into the fibers by conventional means. For example, if the particles are to be incorporated into melt-spin fibers, a master-batch technique, among others, is suitable. For dry-spun or wet spun fibers, the coated particles can be included alone or along with other additives in a concentrated slurry which is then incorporated into the fiber polymer solution stream. In addition to the polymer-coated inorganic particles, other conventional agents optionally can be added to the fiber polymer at the same time. Such agents include antioxidants, thermal stabilizers, UV stabilizers, dyes, lubricating and anti-tack agents and the like. These techniques are illustrated in the Examples below.

TEST METHODS

The following test procedures are used in the Examples below to measure the abrasiveness of synthetic organic fibers containing inorganic particles. Two tests were employed. The first is for elastic yarns. The second is for inelastic yarns.

The abrasiveness of a spandex elastic yarn is measured by forwarding a 40-denier (44-dtex) yarn over a 0.2-mm wide steel sinker blade from a circular knitting machine (supplied by Vanguard Supreme Division of Monarch Mfg. Co. of Monroe, N.C.). The sinker has a Shore Durometer T Hardness of 40. The abrasion test is performed under the following conditions. A sample spandex yarn is removed from a cylindrical yarn package with a roll-off take-off speed of 280 yards/min, is passed over the sinker blade and then to windup at 600 yd/min (548 m/min). The sinker blade contacts the yarn at the mid-point of it travel between the take-off and the windup so that the yarn is deflected from up a straight line path. The yarn makes an angle of 20 degrees between its path upstream and its path downstream of the sinker blade. The length of yarn that passes over the sinker in a given test is measured in meters. The amount of wear on the sinker is determined by image analysis of the irregular groove worn by the yarn on the sinker, using a suitable computer program. The computation involves drawing an imaginary straight line between the unworn surfaces on either side of the groove and integrating the area under the line by drawing hundreds of perpendicular lines from the straight line to the bottom of the groove. Wear, a measure of yarn abrasiveness, is reported in Table I of the Examples below in cubic microns per million meters of yarn, and is based on an average of four tests per sample.

The abrasiveness of an inelastic yarn is determined by measuring the depth of a cut made in a metal rod by passage of the yarn over the rod for a given period of time. In the Examples below, 700-den (770 dtex)/40 filament nylon-6,6 yarn is forwarded for one hour from a feed roll over a brass pin of 0.6-cm diameter and 38 Rockwell B Hardness to a draw roll under the following conditions. Upstream of the pin, a conventional water-based finish is applied to the yarn, amounting to 1.1% of the yarn weight. The feed roll is operated at a temperature of 55° C. and at a surface speed of 170 yd/min (155 m/min). The draw roll speed is 430 yd/min (393/min). The yarn travels across a 160-degree arc on the surface of the brass pin. The depth of the cut made by the yarn is determined from the difference between the starting pin diameter and the "diameter" at the cut, both measured with a dial vernier caliper. The depth of the cut is proportional to the abrasiveness of the yarn amd is reported in Table II of the Examples below in millimeters.

EXAMPLES

The Examples which follow illustrate the coating of inorganic particles by several techniques in accordance with the invention. The advantage in decreased yarn abrasiveness of yarns containing coated inorganic particles rather than non-coated particles is demonstrated with spandex elastic yarn in Example I and with nylon-6,6 inelastic yarn in Example II. In the Examples, all samples of the invention are identified with Arabic numerals and Comparison Samples are identified with upper case letters. The results reported in the following examples are believed to be illustrative and representative of the invention, but do not constitute all the runs involving the indicated ingredients.

EXAMPLE I

In this example, eight samples of inorganic particles coated with organic polymer are prepared and incorporated into spandex elastic yarn in accordance with the invention. Three substantially identical spandex yarns containing the same inorganic particles, but without the polymeric coating are prepared as Comparison samples. Testing of the abrasiveness of the Sample and Comparison yarns, shows the clear advantage for the yarns in accordance with the invention.

The polymer for the spandex was made from a capped glycol that was the reaction product of PO4G of 1800 number average molecular weight and MDI prepared with a capping ratio (i.e., the molar ratio of MDI to PO4G) of 1.63 and having an NCO content of 2.40 weight %. The capped glycol was chain extended with a 90/10 diamine mixture of EDA/MPMD. Diethylamine was employed as a chain terminator. The resultant PO4G(1800):MDI:EDA/MPMD(90/10) polymer was dissolved in DMAc to provide a solution having 36.8% solids. A concentrated slurry of additives in DMAc was made up and milled in a horizontal media mill. The slurry was then incorporated with the polymer solution to give concentrations (based on the weight of the polymer in the solution) of 1.5% Cyanox® 1790, 0.5% Methacrol® 2462B, 0.6% silicone oil, and 2.0% $TiO_2$. When magnesium oxide particles were included, the MgO concentration was 1.5% and the concentration of $TiO_2$ (not coated) was decreased to 0.5%, and 4 ppm KP-32 anthraquinone dye was added. The polymer solution with the incorporated slurry additives was then dry spun into four-coalesced-filament, 44-dtex yarns in a conventional apparatus. Prior to testing a conventional silicone surface lubricating finish was applied to the yarns. The finish added 4% to the weight of the yarn.

The coated particles were prepared as follows.

For Samples 1 and 2, titanium dioxide particles were coated with a polyamide from a solution of the polyamide in DMAc. A 5-liter, 4-neck, round-bottom flask in a heating mantle was employed. A thermometer was inserted in one neck, a stirring agitator in another neck, and a water-cooled reflux column in another neck. Three liters of DMac and 22.2 grams Elvamide® 8063 nylon multipolymer resin were added to the flask. The mixture was heated with agitation to 75° C., and then maintained at that temperature with stirring continued for about one hour until all the Elvamide® was dissolved. A glass funnel was placed in the fourth neck, and 1 Kg of Type R-902 rutile $TiO_2$ (Sample 1) or Type R-103 rutile $TiO_2$ (Sample 2) was added over a two to three hour period while stirring was continued. Both types of $TiO_2$ are available from E. I. du Pont de Nemours & Co., Wilmington, Del., U.S.A. After the addition was complete, the contents were stirred for another 30 minutes with the temperature maintained at 75° C. Then while stirring was continued, the contents of the flask were allowed to cool to room temperature. The resultant Elvamide®-coated $TiO_2$ particles were removed from the DMAc with a sintered glass filter and dried for 12 hours at 90° C. in a vacuum drying oven.

For Samples 3, 4 and 5, Type R-103 $TiO_2$ were coated with a polyamide from a solution of the polyamide in ethanol. A 2.724-Kg load of $TiO_2$ was placed in a large plastic bag. A 10% solution of Elvamide® in ethanol (Gental® 101, sold by General Plastics Corp., Bloomfield, N.J.) was placed in a pistol-grip sprayer and sprayed directly onto the $TiO_2$ in small increments, with rigorous tumbling of the contents between increments. The amount of polyamide coated onto the $TiO_2$ was determined by the amount of polyamide delivered from the sprayer. After the desired amount of solution was added to the $TiO_2$, the bag was securely closed and vigorously tumbled. The product was then dried at 120° C. for 12 hours. Sample 3 had been sprayed with 150 grams of solution to yield $TiO_2$ particles having an Elvamide® coating amounting to 0.5% of the weight of the particle. Sample 4, which had been sprayed with 600 grams of solution, had an Elvamide® coating amounting to 2.2% of the particle weight, and Sample 5, which had been sprayed with 1.2 Kg of solution, had a coating amounting to 4.2% of the particle weight.

Sample 6 was prepared with the same equipment and by the same general procedure as was used for Samples 3-5, except that the Gental® 101 was replaced by 600 grams of Genton ® 310 (a dispersion of 10% Elvamide ® 8063 in water, from General Plastics Corp.). The resultant particles were coated with Elvamide ® amounting to 2.2% of the particle weight.

For Sample 7, $TiO_2$ was coated with a melamine resin as follows. Eight liters of de-ionized water were placed in a 17-liter capacity glass vessel equipped with a motor-driven stirrer. Then while the water was being stirred, 120 g of Melamine Resin Grade BTLM-817 (available from BTL Specialty Resins Corp., Toledo, Ohio) were slowly added and the mixture was heated to, and maintained at 75° C. while being stirred for 30 minutes. Three Kg of Type R-103 $TiO_2$ were added over a 5-minute period. The mixture was stirred for another 10 minutes and then was allowed to cool to 25° C. The $TiO_2$, coated with melamine amounting to 4% by weight of the particles, was filtered from the water, dried at 120° C. for 4 hours, hammer milled, and micronized in a fluid energy mill with superheated steam at 270° C. and with a steam-to-particle weight ratio of 3:1.

For Sample 7, magnesium oxide particles were coated with a polyamide by the general method used for Sample 1. One Kg of magnesium oxide (MagChem 50M, sold by Martin Marietta Magnesia Specialties, Baltimore, Md.), 22.2 grams Elvamide ® 8063, and 3 liters DMAc were used to obtain dried MgO particles that were coated Elvamide ® amounting to 2.2% by weight of the particles. To reduce any agglomerates the coated particles were passed through a hammermill.

Three uncoated particle samples were also included in the tests of this Example. Comparison Sample A comprised non-coated R-902 $TiO_2$; Sample B, non-coated R-103 $TiO_2$; Sample C, non-coated MagChem 50M MgO.

Each of the above-described samples of coated or non-coated inorganic particles was mixed with a slurry of additives that was to be added to the polymer/DMAc solution for dry spinning spandex. Before combining the inorganic particles and the additive slurry with the polymer/DMAc solution, the particle and additive slurries were milled to thoroughly blend and disperse the additives.

The slurries incorporating Sample 1 and Comparison A were each milled at a rate of 30–35 grams/min in a 1.5-liter horizontal mill (Model No. HM-1.5, made by Premier Mills Corp., Reading, Pa.), using Ottowa sand as the grinding medium. The outlet temperature was maintained at 70° C.

The slurries incorporating Sample 2 and Comparison B were milled at a rate of 45 to 50 grams per minute on a 0.25-liter horizontal mill (Model No. HML-0.25, also from Premier Mills) using zirconium beads as the media and operating with an outlet temperature of 70° C.

The slurries incorporating Samples 3, 4, 5, 6 and 7 were milled in the HM-1.5 Premier Mill, using 1000 parts of DMAc, 450 parts spandex polymer, and 1050 parts pigment.

The slurries incorporating Sample 8 and Comparison C were milled on the HM-1.5 Mill from Premier Mills. Glass beads of 1–2 mm size were used as the medium and the mill was operated with a slurry flow of 22 g/min and a tip speed of 2,000 ft/min (609 meters/min).

The milled slurries were then added to the polymer/DMAc solution and dry-spun into 4-coalesced-filament spandex yarns. The spandex yarns were then subjected to abrasiveness tests. Results of the tests, summarized in Table I below, clearly demonstrate that the yarns with the coated inorganic particles were significantly less abrasive than the yarns with the particles that were not coated.

TABLE I

| | Spandex Yarn Abrasion Tests (Example I) | | | |
|---|---|---|---|---|
| Sample | Particles | Coating | wt % | Abrasion |
| 1 | R-902 $TiO_2$ | Elvamide ® | 2.2% | 0.21 |
| A | R-902 $TiO_2$ | None | 0 | 0.62 |
| 2 | R-103 $TiO_2$ | Elvamide ® | 2.2% | 0.47 |
| B | R-103 $TiO_2$ | None | 0 | 0.73 |
| 3 | R-103 $TiO_2$ | Elvamide ® | 0.5% | 0.49 |
| 4 | R-103 $TiO_2$ | Elvamide ® | 2.2% | 0.47 |
| 5 | R-103 $TiO_2$ | Elvamide ® | 4.2% | 0.46 |
| 6 | R-103 $TiO_2$ | Elvamide ® | 2.2% | 0.44 |
| 7 | R-103 $TiO_2$ | Melamine | 4.0% | 0.45 |
| 8 | MgO | Elvamide ® | 2.2% | 0.65 |
| C | MgO | None | 0 | 0.77 |

EXAMPLE II

This example further illustrates the invention with the preparation inelastic nylon yarns containing very hard inorganic particles of cobalt aluminate that are coated in accordance with the invention (Samples 9 and 10) and then compares the abrasiveness of the yarns of the invention with a substantially identical comparison yarn (Sample D), except that the cobalt aluminate particles are not coated. For each sample and comparison the particles were incorporated into the nylon fibers by conventional masterbatch techniques.

Two samples of coated cobalt aluminate particles (Samples 9 and 10) were prepared.

For Sample 9, 22.2 grams of Elvamide ® 8063 were added to 3 liters of DMAc solvent in a 5 liter, 4-neck, round-bottom flask equipped with thermometer, condenser, and mechanical stirrer. The contents were heated to 75° C. with stirring. One Kg of cobalt aluminate powder was added to the contents of the flask. Stirring was continued for an additional 30 minutes with the temperature at 75°–80° C., then cooled to room temperature while stirring. The resultant coated powder was filtered from the DMAc with a sintered glass filter, vacuum dried at 120° C. and micropulverized.

For Sample 10, 40 grams of melamine powder (Melamine Resin Grade BTLM-817, available from BTL Specialty Resins Corp., Toledo, Ohio) were added to 2.5 liters of de-ionized water in a 4-liter beaker and heated with stirring to a temperature of 75° C. to dissolve the melamine in the water. One kg of $CoAl_2O_4$ particles was added to the aqueous melamine solution, the mixture was stirred for 10 minutes while being heated at a temperature in the range of 75°–80° C., after which the mixture was allowed to cool gradually to room temperature. The resultant coated $CoAl_2O_4$ particles were filtered with a sintered glass filter, dried at 120° C. for 4 hours, and micropulverized.

The above described coated particles were incorporated into nylon-6,6 fibers by mixing, with a conventional two-roll mill, in a 1:1 weight ratio (a) the coated (or not-coated comparison Sample D) inorganic particles with (b) Elvamide ® 8063 multipolymer nylon (sold by E. I. du Pont de Nemours & Co., Wilmington, Del.). The mixture was then coextruded with polycaprolactam to prepare a concentrate in which the inorganic particles amounted to 25% of the total concentrate weight. Then, by conventional methods, the concentrate was blended with a molten stream of poly(hexamethylene adipamide) and spun into fibers. The inorganic particles amounted to 0.4% by weight of the melt-spun fibers. Abrasiveness of the yarns was determined by the second of the above-described abrasiveness test methods (in which the depth of a cut made by the yarn passing over a brass rod).

The following table summarizes the test results.

TABLE 2

(Example II. CoAl$_2$O$_4$ Particles)

| Sample | Coating Type | Wt. % | Cut Depth millimeters |
|---|---|---|---|
| 9 | Elvamide ® | 2.2% | 0.267 |
| 10 | Melamine resin | 4.0% | 0.267 |
| D | None | 0 | 0.470 |

The advantage of the coated particles is clearly shown by the table. The nylon yarn containing the coated particles abraded a cut in the brass rod that was only 55% as deep as the cut abraded by nylon yarns that contained particles that were not coated.

We claim:

1. An improved synthetic organic polymer fiber containing finely-divided, inorganic particles dispersed within the fiber, the improvement comprising the inorganic particles having a solid coating of an organic polymer of at least 2,500 number average molecular weight that is not the same as the polymer of the fiber.

2. An improved synthetic organic polymer fiber in accordance with claim 1 wherein the inorganic particles amount to in the range of 0.5 to 8% of the total weight of the fiber, the weight of the coating is in the range of 0.3 to 8% of the weight of the inorganic particles and the number average molecular weight of the polymer of the coating is at least 15,000.

3. An improved synthetic organic fiber in accordance with claim 2 wherein the inorganic particles amount to in the range of 1 to 5% of the total weight of the fiber and the weight of the coating is in the range of 0.5 to 5% of the weight of the inorganic particles.

4. An improved synthetic organic fiber in accordance with claims 1, 2 or 3 wherein the synthetic organic fiber is an elastomeric polyurethane fiber and the polymer of the particle coating is a polyamide polymer or a melamine resin.

5. An improved synthetic organic fiber of claim 4 wherein the inorganic particles are of titanium dioxide or of magnesium oxide.

6. An improved synthetic organic fiber in accordance with claim 4, wherein the inorganic particles are of titanium dioxide and the particle coating is a terpolymer of polycaprolactam, poly(hexamethylene adipamide) and poly(hexamethylene sebacamide).

* * * * *